United States Patent [19]

Warren

[11] 4,317,140
[45] Feb. 23, 1982

[54] STOP AND VARIABLE-SPEED MOTION ON SEGMENTED-SCAN TAPE RECORDING

[75] Inventor: Henry R. Warren, Belle Mead, N.J.

[73] Assignee: RCA Corporation, New York, N.Y.

[21] Appl. No.: 86,401

[22] Filed: Oct. 19, 1979

[30] Foreign Application Priority Data

Aug. 3, 1979 [GB] United Kingdom ............... 27116/79

[51] Int. Cl.³ ............................................. H04N 5/78
[52] U.S. Cl. ........................................ 360/10; 360/21
[58] Field of Search ...................................... 360/9–10, 360/14, 21, 33, 84, 107; 358/4, 127

[56] References Cited

U.S. PATENT DOCUMENTS

| | | | |
|---|---|---|---|
| 3,375,331 | 3/1968 | Okazaki et al. | 360/10 |
| 3,821,787 | 6/1974 | Kihara | 358/4 |
| 3,911,483 | 10/1975 | Kihara et al. | 360/33 |
| 4,197,562 | 4/1980 | Kikuya et al. | 360/10 |

FOREIGN PATENT DOCUMENTS 2814082 10/1978 Fed. Rep. of Germany ........ 360/21
54-105507 8/1979 Japan ..................................... 360/21

OTHER PUBLICATIONS

Pages 62 and 63 of "Television Broadcast Tape Recording Systems", by Harold E. Ennes, 2nd Edition, 1979.

*Primary Examiner*—Raymond F. Cardillo, Jr.
*Attorney, Agent, or Firm*—Eugene M. Whitacre; Paul J. Rasmussen; William H. Meise

[57] ABSTRACT

In a segmented helical-scan recorder-playback arrangement, alternate scans of the heads across the tape transduce information relating to the top and bottom of the raster. Noise bands and raster distortion occurring during the crossover of a scanning head from track to track during playback in a stop or variable-speed mode is prevented by playback heads having gaps wider than the width of the recorded track and by azimuth separation between adjacent tracks.

1 Claim, 12 Drawing Figures

STOP AND VARIABLE-SPEED MOTION ON SEGMENTED-SCAN TAPE RECORDING

BACKGROUND OF THE INVENTION

This invention relates to an arrangement by which stop-motion and variable-speed motion (Moviola) can be achieved on a tape recorder in which a scan of each head across the tape represents less than a complete television vertical field.

Conventional helical-scan video tape recorders have a plurality of heads or transducers each of which makes a single scan across the tape during an interval equal to one vertical field when either recording or playing back. Due to the motion of the tape, the angle of the scan across the tape is not the same as the angle of the track on the tape resulting from recording. In slow or stop-motion, or in fast motion of the tape, the scanning leaves one recorded track and may overlie another, depending upon the width of the guardband. At the time of such a crossing over, a low signal-to-noise condition occurs and a noise band appears on the raster on which the video is displayed. This noise band may be located in the middle of the raster, or the scan can be adjusted to divide the noise band to leave the center of the raster relatively noise-free whereby the noise bands are at the top and bottom of the raster.

Segmented-scan helical recorders scan across the tape in less than one full field, for example during one-half field. Thus two scans of the playback heads are necessary to produce one full field, and the transition between the heads occurs at the center of the field. Adjacent tracks in a segmented-scan recorder contain information derived alternately from the top and bottom of the raster, so crossing over of tracks by a scanning playback head results in gross distortion. It is desirable to provide slow, stop and fast motion in a segmented-scan helical tape recorder.

SUMMARY OF THE INVENTION

A stop and variable speed playback arrangement adapted for playback of a segmented helical-scan recorded tape is described. First and second recorded tracks appear alternately on the tape. The first tracks include TV signals containing information pertaining to the upper portion of the television raster on which the information is displayed. The second tracks include television signals pertaining to the lower part of the raster. The apparatus includes first and second playback heads adapted for alternately scanning the tape for transducing the signals pertaining to the upper and lower portions of the raster. Motion of the tape at speeds other than the speed at which the tracks were recorded creates noise bands during the time at which the head then scanning crosses between first and second tracks. Distortion of the information displayed on the raster also occurs. Elimination of the distortion and the noise bands is accomplished by arranging the first and second heads to have a gap width exceeding the width of the recorded tracks on the tape, so the first and second head gaps overlie at least a portion of the first and second tracks, respectively, during all of each scan. To prevent unwanted response, the first and second playback heads have their gaps at an azimuth angle corresponding to the azimuth angle of the tape so that the first head responds to the signals of the first tracks and does not respond to the signals on the second tracks, and the second head responds to the signals of the second tracks and does not respond to the signals on the first tracks.

DESCRIPTION OF THE DRAWINGS

DESCRIPTION OF THE INVENTION conventional helical-scan video tape recorders make a single scan across the tape with each head during an interval equal to one vertical field (1/60th second). During the interval in which the head scans across the tape, the tape has a small but finite motion. FIG. 1 illustrates a portion of a tape 10 upon which are impressed recorded tracks illustrated as 14, 18, 22 and 27, which tracks are separated by guardbands illustrated as 16, 20 and 24. A dashed line 12 illustrates the angle made by each head as it scans across the tape. Scanning begins at the top of FIG. 1, and ends at the bottom. The tape motion during normal recording and playback is to the right as illustrated in FIG. 1. During the scan of a head from top to bottom of tape 10 along path 12, the tape motion results in the end of the track being displaced relative to the beginning, with the result that a recorded track such as 14 appears to be recorded at an angle other than the angle at which the scanning head travels relative to the tape. As illustrated in FIG. 1, track 27 is the one presently being laid down. Recorded tracks 18 and 22 were laid down previously, and track 14 is the oldest track of those illustrated.

In normal playback, the playback head is scanned mechanically along path 12, and the tape motion during playback causes the head to follow along the track as originally laid down. Precise tracking of the track by the head is not absolutely necessary, for the information in the track is frequency-modulated onto an FM carrier. Thus, so long as there is sufficient FM carrier to saturate a limiter amplifier in the playback apparatus, the frequency demodulator or discriminator will faithfully reproduce the original baseband signal.

Figure 2:
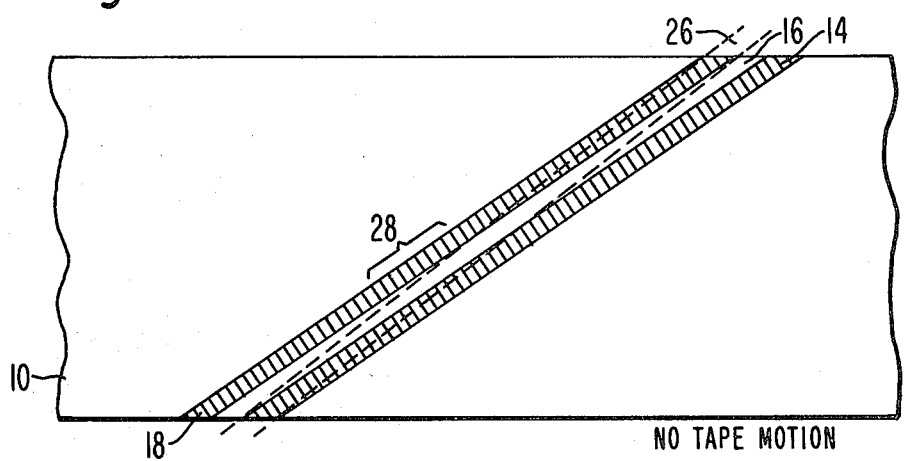
Figure 3:
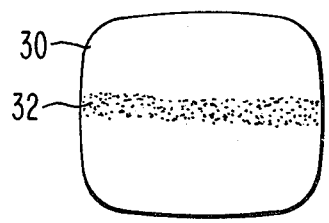
FIG. 3 illustrates noise bands occurring in a raster as a result of the crossing over of heads in a conventional helical scan system as a result of slow or zero tape motion.

Tracks 14 and 18 and guardband 16 of tape 10 are illustrated in FIG. 2. Also illustrated in FIG. 2 is the path or track 26 scanned by the playback head. As illustrated, the playback head scans a track having a width substantially equal to the recorded track. Scanning of the head along track 26 begins at the top of the tape in alignment with the beginning of track 18. In the absence of tape motion, the end of track 26 will end up in substantial alignment with the end of earlier track 14. Since the tape motion at normal playing speed is sufficient to move the tape by an amount equal to the sum of one guardband and one recorded track, in the absence of tape motion the playback head scanning track 26 will always traverse from one recorded track to an earlier recorded (older) track. Thus, at the beginning of track 26 near the top of tape 10 as illustrated in FIG. 2, the reproduced signal representing the top of a television raster being scanned will contain information from later recorded (younger) track 18, whereas near the end of track 26 at the bottom of tape 10 the video will contain information to be displayed at the bottom of the scanned raster which is contained in earlier-recorded track 14. At the center of the scan, in the region in which scanning track 26 crosses from recorded track 18 to recorded track 14, there is a transition region in which the frequency modulated information being picked up by the scanning head transfers from track 18 to track 14. That is, so long as the FM carrier on track 18 being picked up by the scanning head exceeds the FM carrier from track 14, the FM demodulator will reject the track 14 information and process the track 18 information for display. At such a time as the FM carrier on track 14 being picked up by the scanning head exceeds that from track 18, the track 18 information is rejected and the track 14 information is presented for display. In this transition region, the amplitude of both FM carriers is small and therefore the signal-to-noise ratio may be low. Furthermore, since the FM carrier signals on the two tracks are not necessarily in phase, total cancellation of the signal can occur. This results in a noise band which may appear near the center of the raster upon which the information is to be displayed. FIG. 3 illustrates a raster 30 and a noise band 32 resulting from such a cross-over.

Figure 4:
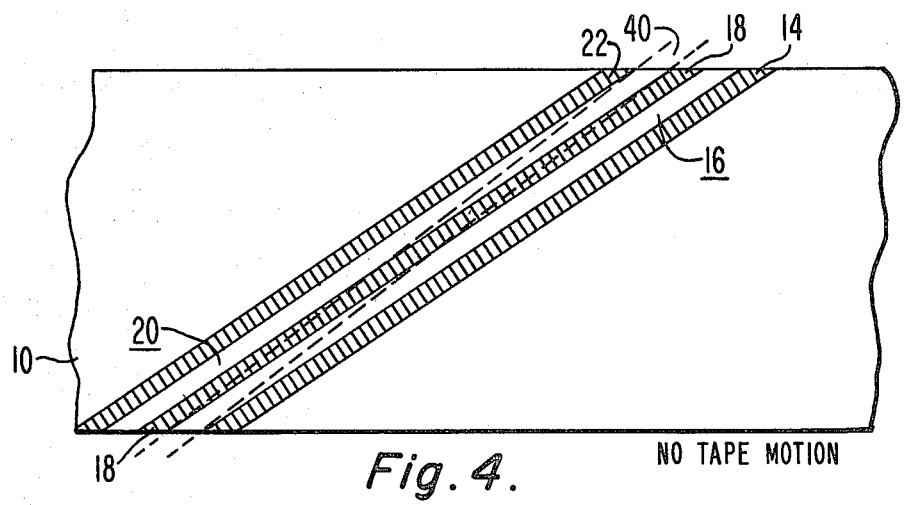
FIG. 4 illustrates head scans and tracks in the prior art to achieve a split noise band.
Figure 5:
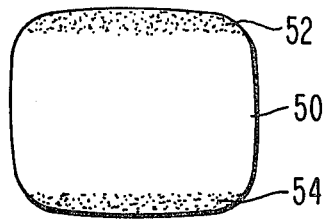
FIG. 5 illustrates a raster with a split noise band resulting from the relationship of FIG. 4.

It is possible to reduce the subjective effect of such a noise band by arranging the track of the scanning pickup head so as to barely coincide with a recorded track at the beginning and at the end of a scan corresponding to a field. In FIG. 4, recorded tracks 14, 18 and 22 are illustrated separated by guardbands 16 and 20. The track 40 scanned by the gap (not shown) of a pickup head is illustrated as being barely on track 18 at the top of the scan. Track 40 for the most part overlies guardband 20 at the top of the tape, so the amount of FM carrier picked up by the head will be small and the signal will be noisy. In the central portion of scanning track 40, the scanning track completely overlies recorded track 18, and produces maximum signal for best signal-to-noise. With increasing time, the pickup head scanning along track 40 leaves track 18 and for the most part overlies guardband 16, with resultant degradation of the signal-to-noise (SN) ratio. FIG. 5 illustrates a raster 50 with noise band 52 and 54 at the top and at the bottom of the raster. Simply increasing the width of the playback head and thereby increasing the width of scanning track 40 so as to overlie more of track 22 at the beginning of scan and more of track 14 at the end of scan will not necessarily ameliorate the SN problem, because the phase of the FM carrier is not controlled as between tracks. Consequently, cancellation of signal can take place. Thus, in the region in which the signals from both tracks are of approximately the same magnitude, the net or sum signal received by the playback head will randomly go to zero and to a value equal to twice that contributed by one track alone. Thus, the noise band in general will continue to exist.

Figure 1:
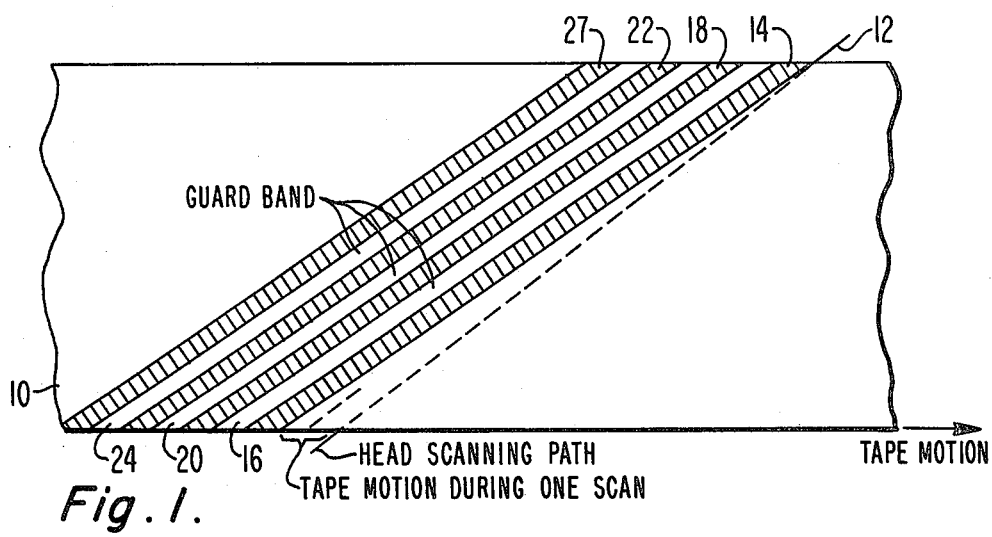
FIGS. 1 and 2 illustrate the scanning path of a record or playback head and the resulting tracks on a tape for normal and zero tape speed, respectively, useful in understanding the prior art and the invention.

The problem of stop-action or variable-speed motion in the case of a segmented recording is more difficult. In a segmented recording, the tape arrangement may be similar to that shown in FIG. 1. However, instead of track 14 representing an entire field, it represents instead one-half of a field, and track 18 represents the other half. This results, for example, when the speed of the headwheel is doubled in order to provide improved frequency response. In such a recorder, there may be two heads, one of which scans tracks 14, 22, etc. and thereby provides the information for the top half of the raster, while the other head scans tracks 18, 26, etc. and provides the information required for the bottom half of the raster.

Figure 6:
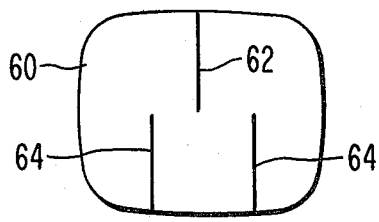
FIG. 6 illustrates the undistorted pattern of video on a raster for reference.
Figure 7:
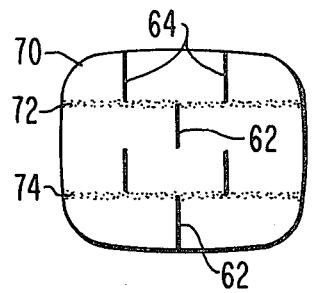
FIG. 7 illustrates the distortion to the video resulting from zero tape motion in a prior art segmented-scan recorder.

If motion is stopped in a segmented-scan tape recorder, the resulting situation can be illustrated with the aid of FIG. 2 and FIG. 6. FIG. 6 illustrates the video pattern which is desired to display on a raster and which would in fact be displayed if the tape were running at its correct speed on playback. Vertical lines 62 would be recorded on track 14, and vertical lines 64 on track 18. When the motion is stopped, the playback head scans along track 26 as described previously in conjunction with FIG. 2. Head scanning along scanning track 26 begins on later-recorded track 18 with a first head (A), so the top of the raster will display information intended to be displayed below the central portion of the raster, as illustrated in FIG. 7. Head A continues and crosses into guardband 16 near region 28 at a time halfway through its scan. Remembering that a complete scan by head A along track 26 represents only one-half of a field, the noise band will appear as 72 in FIG. 7. Head A continues scanning along track 26, and then overlies earlier-recorded track 14, providing a display for the last portion of the top half of the raster which is approximately correct. As head A leaves track 26 from the bottom, head B begins scanning along track 26 to provide the information necessary to complete the lower part of raster 70. The first portion of the lower part of raster 70 is completed with the information from the earliest-recorded portion of track 18, which is the line 64. Head B crosses over guardband 16 in region 28 producing a second noise band 74, and once again overlies track 14 to provide a display of vertical line 62. Comparison of raster 70 with raster 60 shows that stop motion in a segmented-scan situation produces gross distortions of the displayed information.

Arranging the scanning of the heads to overlie a guardband at the beginning and at the end of the scan as illustrated in FIG. 4 does not help the situation. In FIG. 4, for segmented operation, tracks 14 and 22 contain information related to line 62 in the upper half of raster 60 while the track 18 contains information relating to lines 64 in the lower half of the raster. Since track 40 scanned by heads A and B receives information essentially only from track 18, the raster will display lines 64 in both the top and the bottom half of the raster, which is also a gross distortion.

Figure 8B:
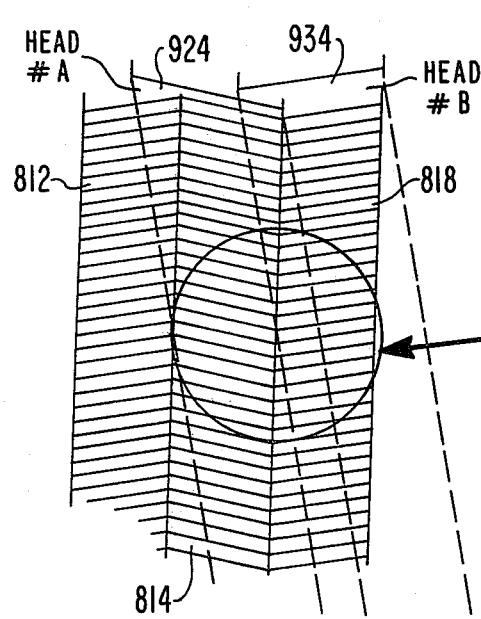
FIG. 8a illustrates a portion of a recorded tape and recorder head scan track and FIG. 8b an enlargement thereof according to the invention.
Figure 8A:
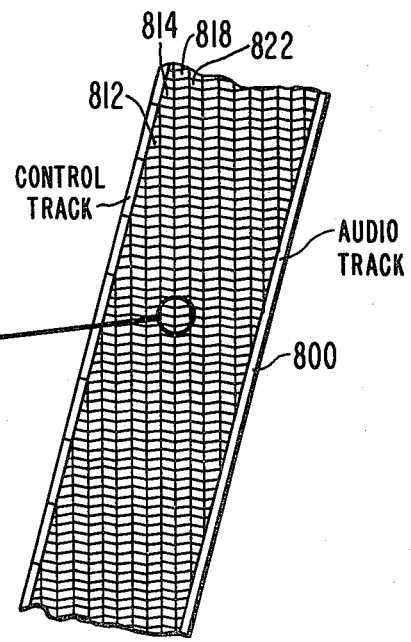

FIG. 8 represents the recording format for a segmented-scan recorder according to the invention. The format illustrated in FIG. 8 does not include guardbands; instead, tracks 814, 818, 822 etc. are recorded with a tape moving in the direction illustrated in FIG. 8a. Consequently, track 814 is recorded earlier and is therefore an older track than 818, 818 is older than 822 and so forth.

FIG. 8b illustrates a detail of FIG. 8a. In FIG. 8b, earlier-recorded track 814 is on the left and later-recorded track 818 is on the right. As described in conjunction with segmented recording, track 814 contains television signals bearing information relating to one-half of a television field and track 818 carries information for the other half. In this example, it may be assumed that track 814 contains information relative to the top half of the scan and track 818 contains information related to the bottom half.

Tracks 814 and 818 are recorded by recording heads having gap azimuth angles which are other than in quadrature to the scanning direction. For example, the recording head gap azimuth angle for track 814 may be +7° from 90° to the scanning direction, and recording head for track 818 would then be at −7°. Such angles are chosen in known manner based upon the relative velocity between the scanning head and the tape, and the wavelength of the modulated FM carrier signal on the tape, so as to allow discrimination between the tracks upon playback. For example, for a relative velocity between the tape and the head of 456 inches per second (11.58 meters/sec) and a lowest FM deviation frequency of 8 MHz, the longest wavelength on the track is approximately 57 microinches ($1.44 \times 10^{-6}$ meters). The angle made by the gap of the pickup head relative to the longitudinal direction of the track at the first null is approximately 0.672°. The eleventh null occurs at 7°. The recorded tracks may be said to have an azimuth angle corresponding to the azimuth angle of the gap by which they were generated. The relative response of a playback head partially overlying a track can be described mathematically when a particular recorded frequency is assumed, and that response has well-defined peaks and nulls which depend upon the number of wavelengths intercepted by the scanning head. However, in actual practice the frequency of the recorded signal changes constantly, and the wavelength therefore also changes. Thus, well-defined nulls do not occur in practice. It can be said, however, that the signal response to a track of corresponding azimuth angle increases as the scanning head overlies the recorded track more completely, and that the response decreases as the azimuth angle between the recorded track and the playback head increases. Generally speaking, the relative response decreases as a function of increasing angle between playback head and recorded track.

A physical structure by which playback scanning may be accomplished is illustrated in FIG. 9. In FIG. 9, a headwheel 900 rotates on an axis 910 and bears an A playback head 920 and a B playback head 930.

Figure 9A:
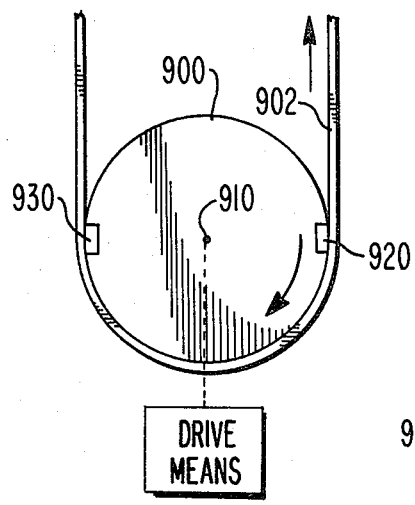
FIGS. 9a-9c illustrates different views of a physical structure by which the condtions of FIG. 8 may be realized.
Figure 9B:
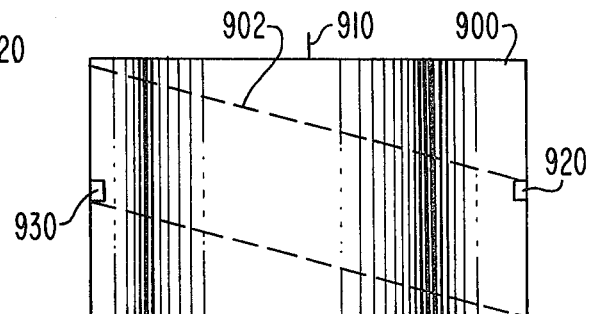
Figure 9C:
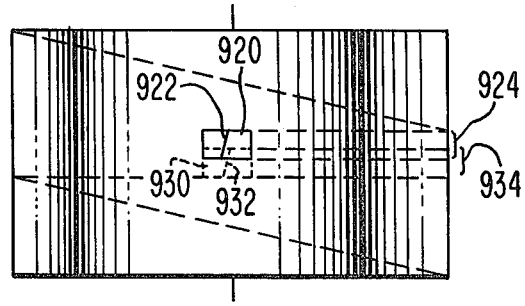

A tape 902 is wrapped about a portion of headwheel 900 as illustrated in FIG. 9a. In FIG. 9b, tape 902 is illustrated in phantom to allow heads 920 and 930 to be seen. Head 920 is slightly closer to the top of headwheel 900 than is head 930. FIG. 9c illustrates headwheel 900 rotated 90° about axis 910 from the position shown in FIGS. 9a and 9b. In FIG. 9c, head 920 faces the view, and a gap 922 in head 920 may be seen. Gap 920 is not parallel with axis 910, and scans a path illustrated as 924 across tape 902. Head 930 is on the side of the headwheel opposite the viewer in FIG. 9'c, and is illustrated in phantom. A gap 932 in head 930 as illustrated has the same azimuth angle as gap 922 because gap 932 as illustrated is viewed from the rear. When headwheel 900 rotates so that gap 932 faces the viewer, the azimuth angle of gap 932 will be opposite to that of gap 922. In other words, the inclinations of gaps 922 and 932 as they scan the tape are opposite.

Gap 922 is axially offset along headwheel 900 from gap 932. This results from the offset positioning of heads 920 and 930. Consequently, gap 922 scans a track illustrated as 924 across tape 902 as headwheel 900 rotates. At a time when head 930 and gap 932 scan across the tape, gap 932 scans a track 934 across tape 902. As illustrated in FIG. 9c, tracks 924 and 934 partially overlap.

When the pickup head A has its gap angled so as to correspond with the angle of the recording head by which track 814 was formed and pickup head A scans track 814, the response of head A to the signal in track 814 will be at a maximum and the response of head A to the signal in adjacent track 818 will be very low. Similarly, pickup head B has its gap canted 7° in the opposite direction, whereby the gap direction matches that of the recording head by which track 818 was formed. Head B will respond to the signal in recorded track 18 and will reject the signal in recorded track 14.

FIG. 8b illustrates in addition to recorded tracks 812–818 the tracks scanned by playback heads when tape 800 is played back by an apparatus such as that of FIG. 9. As illustrated in FIG. 8b, the tape is not moving in order to provide stop motion display, so parallel tracks 924 and 934 scanned by the gaps of playback heads A and B are not parallel with recorded tracks 812–818, for the reasons discussed in conjunctin with FIG. 2.

As illustrated by the width of track 924 of FIG. 8, the gap in head A is slightly wider than the width of track 814, and as illustrated by 934, the track scanned by the gap in head B is slightly wider than the width of track 818. Track 924 followed by the gap of head A partially overlies track 814 and track 812 at the beginning of head scanning in stop-mode operation as illustrated in FIG. 8a. Similarly, track 924 followed by the gap of head A partially overlies track 814 and track 818 at the end of scanning, and lies across all three tracks near the center of scan. However, head A responds only to track 814 because of the azimuth angle of the playback head which reduces the relative response of the playback head to the signal on track 818 relative to track 814. A further reduction in the signal level response of the head to track 818 over the principal portion of the scan results from the relatively small part of the gap which overlies track 818. Consequently, the signal response of head A to track 814 will be greater than the response to track 18, and the vestigial track 818 information remaining is completely rejected by action of the FM demodulation system. Thus, the scanning of head A across track 814 produces a substantially constant-amplitude FM signal from track 814 during those portions of the scanning in which head A completely overlies track 814, and produces little signal from tracks 812 and 818. As illustrated in FIG. 8a, near the end of the portion of scanning shown, scan track 924 of head A overlies approximately one-half of track 814, whereby the received signal level will be reduced by 3dB (6dB in voltage). While this may reduce the received signal-to-noise ratio, it does not totally degrade the signal as does the prior art described in conjunction with FIGS. 1 and 2. Even with such a reduction in the level of the desired signal from track 814, it remains well above the response to tracks 812 and 818, and the FM demodulator rejects the unwanted response.

Thus, head A scans across the tape and responds to track 814 over its entire length, thereby providing a correct scan for the first half of the vertical scan across the raster, notwithstanding that head A lies across more of track 818 at the end of scan than it does across track 814. As head A leaves track 814 at the end of scan, head B begins to scan track 818. As mentioned, the tracks scanned by heads A and B are parallel but not congruent. At the time head B begins to scan across tape 818, head B lies mostly across track 814 and only partially over track 818 as illustrated by track 924 followed by the gap of head B. Nevertheless, due to the canting of head B to match track 818, head B responds only to track 818 and rejects the information contained in track 814. Thus, scanning of head B to begin the second half of the raster produces a signal from later-recorded track 818 bearing information relating to the lower portion of the raster. In a similar manner, head B scans the entire length of track 818 and straddles track 818 near the central region illustrated in FIG. 8a. At that time, portions of head B overlie track 814 and track 822 (not shown) as well as track 818. Nevertheless, head B does not respond to tracks 814 and 822, because the angle at which they were recorded does not match the azimuth angle of the gap of head B. Consequently, head B scans the entire length of track 818, and responds only to track 818 notwithstanding that head B overlies tracks 814 and 822 at the extremes of scan by a greater amount than the head overlies track 818.

Figure 10:
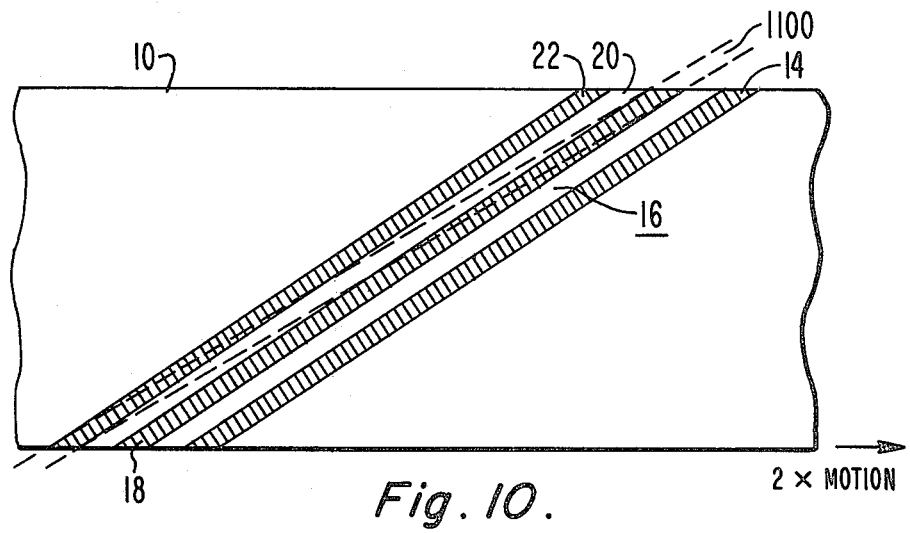
FIG. 10 illustrates a portion of a recorded tape and a scan track in a fast tape motion condition.

The alternate overlapping scanning of heads A and B which are canted to two azimuth angles enables stop-motion operation of a segmented scan helical recorder. Fast-motion recording is also possible. The discussion associated with FIG. 2 described how track 26 followed by the playback head in the case of stop-motion began scanning at one end of a later-recorded track and ended up on the end of an earlier-recorded track 14. If the tape in FIG. 2 is provided with a uniform motion to the right at a small speed less than the normal speed, the ending point of track 26 at the bottom of tape 10 will be somewhere in between track 14 and track 18. As the tape speed is increased to equal the normal scanning speed, track 26 will then overlie recorded track 18 over its entire length. By analogy, doubling the tape speed will cause the scanning track of the playback head to end its scan overlying a later-recorded track than the track on which scanning begins, as illustrated by scanning track 1100 of FIG. 10 which overlies recorded track 18 at the beginning of scan at the top of tape 10 and which overlies later-recorded track 22 at the end of scan at the bottom of tape 10 at double-speed motion to the right. Similarly, at 3X tape velocity, scanning track 1100 will overlie track 18 at the beginning of scan, track 22 near the center of scan and a later-recorded track 26 at the end of the scan. The arrangement of heads A and B with angled gaps as illustrated in FIG. 8 is suitable for high-speed Moviola presentation as well as stop-motion presentation, since the relatively wide head with a wide gap always overlies at least portions of two adjacent tracks, and responds to only that track carrying information which is intended to be received.

What is claimed is:

1. An improved arrangement adapted for transducing signals from a tape helically recorded within first and second tracks alternately impressed with information from the upper and lower parts of a raster, the first tracks being recorded at a first azimuth angle and the second tracks being recorded at a second azimuth angle, the arrangement comprising:

a headwheel about which said magnetic tape moves along a helical path during said normal and variable-speed modes of operation, said tape being wrapped substantially 180 degrees about said headwheel;

drive means coupled to said headwheel for driving said headwheel one complete revolution per field; and first and second playback heads disposed at diametrically opposed positions about the periphery of said headwheel, said first and second playback heads sequentially scanning first and second tracks on said tape for transducing signals therefrom, whereby said motion of said tape during said modes of operation other than said normal mode of operation causes the playback head then scanning said tape to cross from said first recorded track to said second recorded track thereby causing distortion;

wherein the improvement lies in that said first and second heads each have a gap width exceeding the width of said first and second tracks, respectively, whereby said first and second gaps overlie at least a portion of said first and second tracks, respectively, during the entirety of each scan; and said first and second playback head gaps each have an azimuth angle corresponding to those at which said first and second tracks were recorded, respectively, whereby said first head responds to the signals on one of said first tracks and does not respond to the signals on said second tracks during the entirety of each scan of said first head, and said second head responds to the signals on one of said second tracks and does not respond to the signals on said first tracks during the entirety of each scan of said second head for eliminating said distortion.

* * * * *